Patented Dec. 18, 1928.

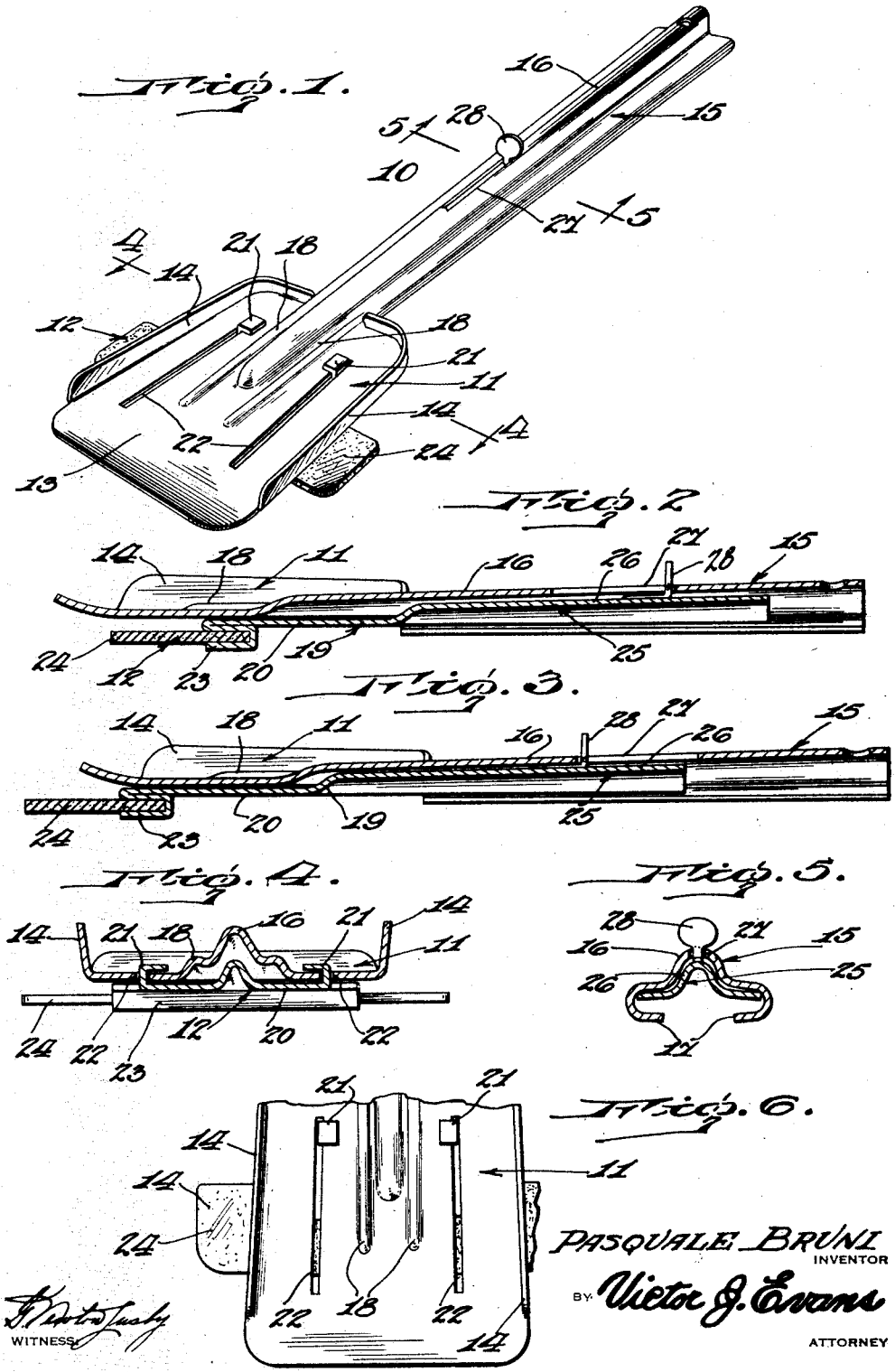

1,696,076

UNITED STATES PATENT OFFICE.

PASQUALE BRUNI, OF FORT LEE, NEW JERSEY.

COMBINATION IMPLEMENT.

Application filed August 29, 1927. Serial No. 216,250.

This invention relates to improvements in combination implements and has particular reference to a combined shovel and scraper for kitchen sinks.

The primary object of the invention resides in a single implement which embodies a shovel and scraper for performing the purpose of the individual implements heretofore used for sink cleaning in the household, and which implements often become separated from each other when they may be needed for scraping up the particles of waste and for scooping them up for removal. With my improved implement, the articles are always accessible for ready use.

Another object of the invention is to provide a shovel or scoop having a scraper slidably mounted on the underside thereof and which may be moved to a position beyond the scoop for scraping purposes, or retracted to a position inward of the end of the scoop so as not to interfere with the use of the device for scooping purposes.

A still further object is to provide a combination sink shovel and scraper which is simple of construction, easy of operation, and inexpensive of manufacture.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a perspective view of my improved combination implement with the scraper in a retracted position.

Figure 2 is a vertical longitudinal sectional view therethrough.

Figure 3 is a similar view, but showing the scraper in an extended position.

Figure 4 is a vertical transverse sectional view on the line 4—4 of Figure 1.

Figure 5 is a similar view on the line 5—5 of Figure 1.

Figure 6 is a top plan view of the lower end of the device.

Referring more particularly to the drawing, the reference numeral 10 designates my improved combination implement in its entirety and which includes a shovel element 11 and a scraper element 12. The shovel element 11 is constructed of sheet metal which is stamped and shaped to provide a head or scoop 13, the outer edge of which is bent upwardly as at 14 and by which the particles to be scooped may be caused to slide upon the head or scoop member. A handle element 15 extends from the scoop or head 13 and is provided with a central rib 16 on the top thereof, while the sides of the handle member are bent inwardly to provide flanges 17. The rib 16 serves to reinforce the handle and also acts as a guide in a manner to be presently described. Ribs 18 extend longitudinally of the scoop 13 to strengthen the same.

The scraper element 12 is disposed on the underside of the shovel and comprises a holder member 19 having a flat head 20 provided on its sides with lugs 21 which pass through outwardly converging slots 22 in the scoop. The extreme end of the head is bent into S-shape to provide a resilient clip 23 for removably receiving a flexible scraper or squeegee 24 which extends the width of the scoop 13 and slightly beyond the sides of the same. The scraper may be constructed of any suitable flexible material such as rubber or leather. Extending from the head of the scraper element is a reduced shank 25 which is provided with a rib 26 for reception within the rib 16 of the handle member and by which the scraper element is guided during its sliding movements. The side edges of the shank 25 are concealed by the flanges 17 of the handle.

For the purpose of manipulating the scraper element and for limiting movement of the same in opposite directions, I provide the handle member with a manipulating slot 27 through which a manipulating member 28 extends and which manipulating member is formed upon the shank 25 of the scraper element.

In practice, the scraper element is normally in the position shown in Figures 1 and 2 of the drawing, in which the member 24 is disposed inwardly of the outer bent edge of the scoop, whereby the scoop or shovel may be used without interference by the scraper element. The scraper element is held in this position by reason of the converging slots 22 as the lugs 21 are resilient and become wedged into engagement with the walls of the slot to prevent accidental sliding of the scraper element. The inward movement of the scraper element is limited by reason of the manipulating member 28 engaging the outer end of the slot 27. Should it be desired to extend the scraper element to an operative position beyond the end of the shovel, the operator pushes inwardly upon the manipulating member 28 with the thumb of the hand in which the article is held and proceeds to slide the same until the flexible scraper member 24 is in a full extended position. The scraper element 24 projects slightly beyond the edge of the shovel and is capable of flexing during the scraping operation.

The invention will be found most useful in removing particles of waste from the kitchen sink as the said particles may be scraped into a pile by the scraper element, and the said element retracted to permit of the removal of the waste particles by scooping the same up by the shovel. It is the present practice to employ either a brush or a scraper for accumulating the particles and a shovel for removing the same, but it is my intention to combine both of these articles into a single unit so that they will always remain together for ready use.

In addition to the use herein described, the article may be used for other purposes such as the cleaning of glass windows at which time the flexible scraper 24 may be used as a squeegee for wiping the window glass dry of any water left thereon during the washing operation.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. A combination implement comprising a shovel having a scoop, and handle extending therefrom, said scoop having converging slots therein, a holder slidably mounted on the underside of said shovel and provided with lugs passing through said slots, a flexible scraper carried by said holder, and manipulative means on said holder and operable from the said handle.

2. A combination implement comprising a shovel having a scoop and handle extending therefrom, said scoop having converging slots therein, a holder slidably mounted on the underside of said shovel and provided with lugs passing through said slots, a flexible scraper carried by said holder, said handle being provided with a longitudinal slot, and a manipulative element extending from said holder and passing through said slot.

3. A combination implement comprising a stamped sheet metal shovel, longitudinal inturned flanges on the handle of said shovel, said shovel having a pair of longitudinal slots in the scoop end thereof, said slots converging from their forward terminals adjacent the edge of said scoop to their rearward terminals, a scraper slidably mounted on said shovel, comprising a shank disposed within said flanges, a head beneath said scoop carrying a flexible scraper element, said scraper adapted for relative longitudinal movement to locate said scraper element in operative or inoperative position, and a pair of resilient lugs on said head protruding through said slots and adapted to co-operate with the latter to maintain said scraper element in operative position forward of the edge of said scoop.

In testimony whereof I hereby affix my signature.

PASQUALE BRUNI.